US009531191B2

(12) United States Patent
Belur et al.

(10) Patent No.: US 9,531,191 B2
(45) Date of Patent: Dec. 27, 2016

(54) METHOD AND APPARATUS FOR POWER IMBALANCE CORRECTION IN A MULTI-PHASE POWER GENERATOR

(71) Applicant: Enphase Energy, Inc., Petaluma, CA (US)

(72) Inventors: Raghuveer R. Belur, Los Altos Hills, CA (US); Ho Gene Choi, Petaluma, CA (US); Mark Baldassari, Santa Rosa, CA (US)

(73) Assignee: Enphase Energy, Inc., Petaluma, CA (US)

( * ) Notice: Subject to any disclaimer, the term of this patent is extended or adjusted under 35 U.S.C. 154(b) by 348 days.

(21) Appl. No.: 14/160,913

(22) Filed: Jan. 22, 2014

(65) Prior Publication Data
US 2014/0203646 A1    Jul. 24, 2014

Related U.S. Application Data

(60) Provisional application No. 61/755,164, filed on Jan. 22, 2013.

(51) Int. Cl.
*H02J 3/26*  (2006.01)
*H02M 1/12*  (2006.01)

(52) U.S. Cl.
CPC .................. *H02J 3/26* (2013.01); *Y02E 40/50* (2013.01); *Y10T 307/549* (2015.04)

(58) Field of Classification Search
CPC ........................................................ H02M 1/12
USPC ............................................................ 307/82
See application file for complete search history.

(56) References Cited

U.S. PATENT DOCUMENTS

2013/0155738 A1* 6/2013 O'Brien .................... H02J 3/18
                                                                 363/95
2013/0176752 A1* 7/2013 Schelenz ............... H02M 1/088
                                                                 363/17

OTHER PUBLICATIONS

Healey, "Perception in Visualization", Department of Computer Science, North Carolina State University, 30 Pages, May 11, 2009.

* cited by examiner

*Primary Examiner* — Robert Deberadinis
(74) *Attorney, Agent, or Firm* — Moser Taboada

(57) ABSTRACT

A method and apparatus for power imbalance correction comprising: a plurality of converters for converting a plurality of DC inputs to a multi-phase AC output, and coupling the multi-phase AC output to a multi-phase AC line, and a controller coupled to the plurality of converters. The controller determining whether phases of the multi-phase AC output are balanced, and controlling when all phases of the multi-phase AC output are not balanced, at least one converter of the plurality of converters to balance the multi-phase AC output.

20 Claims, 3 Drawing Sheets

METHOD AND APPARATUS FOR POWER IMBALANCE CORRECTION IN A MULTI-PHASE POWER GENERATOR

CROSS-REFERENCE TO RELATED APPLICATIONS

This application claims priority to U.S. Provisional Patent Application No. 61/755,164 filed on Jan. 22, 2013 which is incorporated by reference herein in its entirety.

BACKGROUND

Field

Embodiments of the present invention generally relate to distributed power systems and, more particularly, to compensating for imbalances in a multi-phase distributed power system.

Description of the Related Art

Distributed power systems are typically comprised of a power source (that generates direct current (DC) power) coupled to a power converter, and a controller. The power source may be a photovoltaic (PV) module or PV panel array, a wind turbine or a wind turbine array, an energy storage device such as a battery, fuel cell, and the like. The power converter converts the DC power into alternating current (AC) power, which may be coupled directly to the AC power grid. The controller monitors and controls the power sources and/or power converter to ensure that the power conversion process operates as efficiently as possible.

One type of power converter is known as a microinverter. Microinverters typically convert DC power to AC power at the power source. Thus, each power source is typically coupled to a single microinverter. A plurality of AC power outputs from the plurality of microinverters may be coupled in parallel to the AC power grid. For systems using microinverters that each generate a single-phase output, multiple phases may be formed by manipulating the output of the microinverters such that each microinverter outputs power of a different phase. For example, for a three-phase AC power grid, three microinverters would output power for three different phases corresponding to the phases of the grid. Thus, for a large multi-phase installation, the total number of inverters may be a multiple of the number of phases; e.g., nine inverters for a three-phase system. Alternative embodiments include systems that have a disproportionate or different number of inverters per phase. Since the outputs of the microinverters are coupled in parallel directly to the AC power grid, all the parallel connected microinverters are simply phase synchronized to the AC power of the AC power grid. The synchronization may be achieved by periodically sampling the AC power grid and controlling the microinverter system to match the sampling.

The microinverter system producing the three-phase power conditionally outputs all phases as long as the phases are of substantially equal power. Should one of the outputted phases have unequal power with respect to the power on the other two phases, the system shuts down or otherwise operates with power/current curtailment to prevent the imbalance from being passed to the AC grid. Voltage imbalance may also be an issue as AC grid requirements have specific voltage thresholds at the point of common coupling (PCC) and electrical connection points (ECPs) between the grid and the distributed power system.

Therefore, there is a need for a cost effective method and apparatus to ensure power imbalance and voltage imbalance compensation to avoid a shutdown of a distributed generation system.

SUMMARY OF THE INVENTION

Embodiments of the present invention generally relate to a method and apparatus for controlling operation of inverters for compensating of power output differences substantially as shown in and/or described in connection with at least one of the figures, as set forth more completely in the claims. Additional embodiments correct voltage, phase, frequency, power factor, harmonics among the phases by controlling inverters using measured parameters.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for compensating for voltage and/or power imbalance in a distributed power system. In one embodiment, voltage and current are sampled to determine whether a power imbalance exists in the output of a plurality of power converters of a distributed power system. Accordingly, if an imbalance is detected, the remaining converter(s) are adaptively controlled such that the power outputs for the phases are of the same magnitude to avoid premature shutdown due to otherwise unequal power output. Magnitude adjustments may be determined by specified parameters obtained via voltage and current samples. In additional embodiments, a voltage imbalance in the output of a plurality of converters is corrected. Exemplary embodiments disclosed herein include power and voltage imbalance correction for a single-phase converter to multi-phase system. However, further embodiments include correcting phase, frequency, power factor, and harmonics cancellation among the phases by controlling converters using measured AC parameters at the output of converters. Further embodiments include adjusting multi-phase converters across multi-phase systems.

Figure 1:
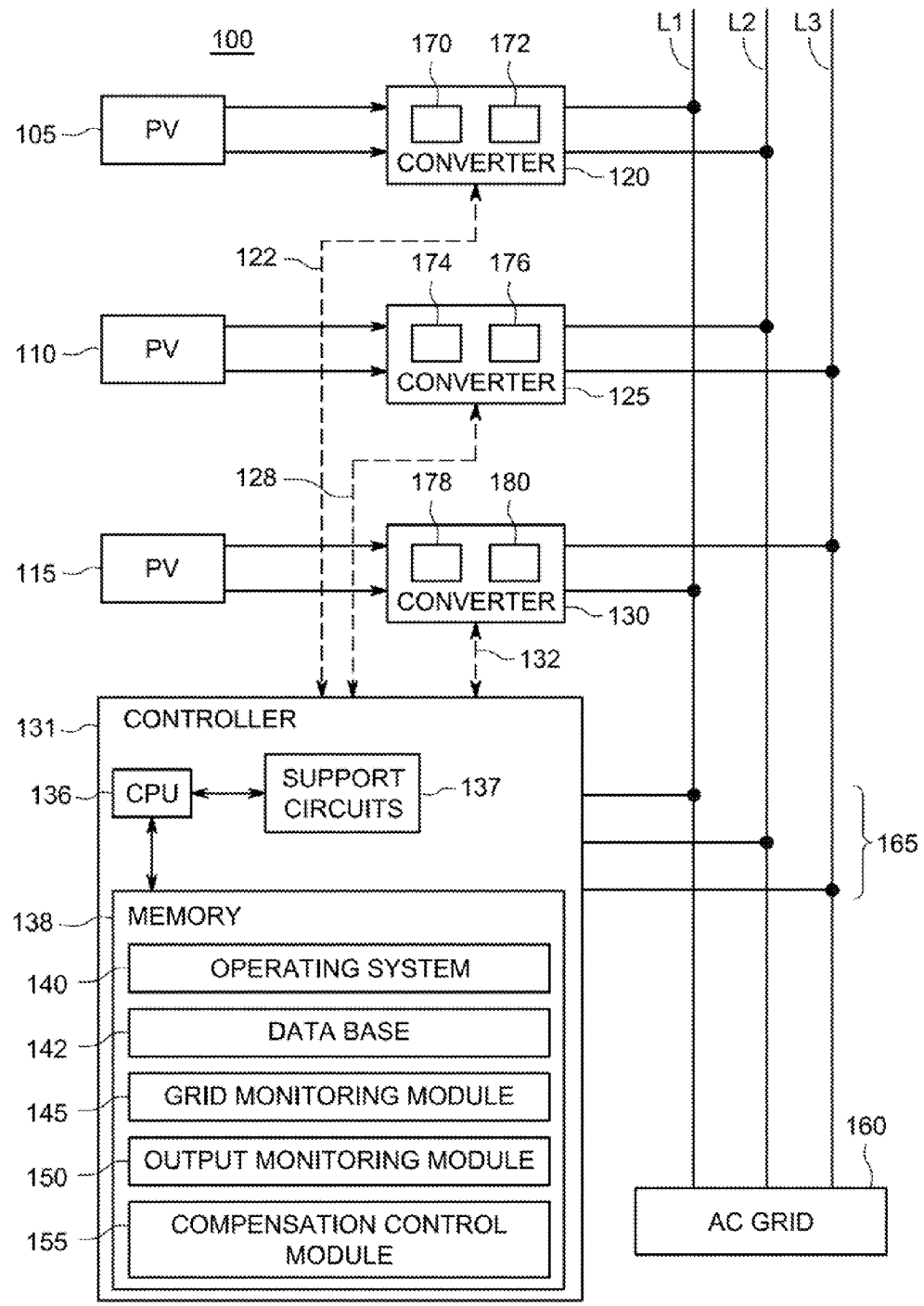
FIG. 1 depicts a block diagram of a portion of an exemplary distributed power system in accordance to one or more embodiments of the present invention.

FIG. 1 depicts a block diagram of a portion of an exemplary distributed power system 100 in accordance with one or more embodiments of the present invention. The distributed power system 100 ("system 100") comprises a plurality of power sources that in this embodiment are PV modules (105, 110, 115). The system 100 further comprises a plurality of power converters (120, 125, 130), which also may be referred to as converters (120, 125, 130), and a controller 131. The system 100 is coupled to a multi-phase (e.g., three-phases are shown) AC grid 160 via AC bus lines (L1, L2, L3). For simplistic explanation, three power converters (120, 125, 130) are shown in FIG. 1, however multiple converters may be used to output a given phase. For example, in a 12 converter three-phase system, four converters would each output power at one of the three phases. Although FIG. 1 depicts PV modules as the power sources, other power sources, e.g., wind turbines, energy storage batteries, generators, fuel cells, and the like may additionally or alternatively be utilized in place of the PV modules.

In one exemplary embodiment of the invention each converter 120, 125, and 130 produces power for a single-phase and the aggregate output of the three converters 120, 125, and 130, supplies power across the three bus lines L1, L2, and L3 to the AC grid 160 as depicted in FIG. 1. The specific connections to each bus line L1, L2, and L3 from respective converters 120, 125, and 130 may be reconfigured in other embodiments so long as each converter outputs a different phase of AC power to the bus lines L1, L2, and L3. Further embodiments may include a neutral line connection in addition to the AC bus lines L1, L2, and L3. In such an embodiment, the neutral line is utilized as a reference for the other phase lines. In some alternative embodiments, the system 100 may generate two phases of output power; in such embodiments, the number of converters in the system 100 is a multiple of two.

Additional embodiments may include more than three PV modules and converters as long as the number of converters is a multiple of the number of phases at the load. For example, 12 converters may be used for a three-phase AC grid system.

The converter 120 is coupled between the PV module 105 and bus lines L1 and L2. The converter 120 converts DC power from the PV module 105 into a single-phase AC output power that is coupled to bus lines L1 and L2.

The converter 125 is coupled between the PV module 110 and bus lines L2 and L3. The converter 125 converts DC power from the PV module 110 into a single-phase AC output power that is coupled to bus lines L2 and L3.

The converter 130 is coupled between the PV module 115 and bus lines L3 and L1. The converter 130 converts DC power from the PV module 115 into a single-phase AC output power that is coupled to bus lines L1 and L3. The converters 120, 125, and 130 communicate with the controller 131 using power line communications (PLC), although in other embodiments, other types of wired and/or wireless communications may be used.

The converters 120, 125, and 130 each respectively comprise AC current samplers 170, 174, and 178, as well as AC voltage samplers 172, 176, and 180. The current samplers 170, 174, and 178 and the voltage samplers 172, 176, 180 measure the current and voltage generated by the corresponding converter; in some embodiments, the current samplers 170, 174, and 178, and the AC voltage samplers 172, 176, and 180 each comprise an ND converter for generating digital signals that represent the measured current and voltage. Alternative embodiments use DC samplers to sample DC power drawn from the PV module for calculation of the AC power to be delivered to the bus lines L1, L2, and L3. The AC voltage, current, and power in such an embodiment is thus inferred from the measured DC power.

The PV modules (105, 110, 115) output DC power to the converters (120, 125, 130) for AC conversion and output to respective AC bus lines (L1, L2, and L3). The controller 131 monitors and controls the converters (120, 125, 130) and is coupled to the AC bus lines L1, L2, L3 via an AC line interface 165. The controller 131 uses the AC line interface 165 to monitor the AC grid voltage and in some embodiments, the power output from the converters 120, 125, and 130. In some embodiments, the converters 120, 125, and 130 each determine based on the AC current and voltage samples, the amount of power they are producing and communicate such information to the controller 131; the converters 120, 125, and 130 may additionally or alternatively communicate information data on AC voltage and/or AC current to the controller 131. In some alternative embodiments the controller 131 or a separate unit may be coupled to each of the converters 120, 125, and 130 via control bus lines 122, 128, and 132 (shown in phantom) for determining one or more of AC voltage, AC current, and AC power generated by the converters 120, 125, and 130.

The controller 131 comprises a CPU 136 coupled to support circuits 137 and memory 138 containing, for example, instructions, data, and algorithms. The controller 131 may be comprised of hardware, software, or a combination thereof. The CPU 136 may comprise one or more conventionally available processors, microprocessors, microcontrollers, and/or combinations thereof configured to execute non-transient software instructions to perform various tasks in accordance with the present invention.

The controller 131 may be implemented using a general purpose computer that, when executing particular software, becomes a specific purpose computer for performing various embodiments of the present invention. In alternative embodiments, the controller 131 may also be a state machine and not programmed with software. The CPU 136 processes inputs and outputs to the transistors/switches, external communications and the AC line interface 165. Support circuits 137 are well-known circuits used to promote functionality of the CPU 136. Such circuits include, but are not limited to a cache, power supplies, clock circuits, buses, input/output circuits, and the like. Additionally, the support circuits 137 may include circuitry for sensors (e.g., voltage, current, temperature, photo-detectors and the like) used to determine operating conditions and data. Alternative embodiments may use control algorithms on a custom Application Specific Integrated Circuit (ASIC) or Field-Programmable Gate Array (FPGA) such that the CPU 136 is a proprietary processor. In some embodiments, converter control techniques described herein that are executed by the controller 131 may be compatible with Reactive Power Control (RPC) requirements that come from Advanced Grid Functional (AGF) requirements. Support circuits 137 may also include communication circuitry for facilitating communication with the converters 120, 125, and 130.

The memory 138 may comprise random access memory, read only memory, removable disk memory, flash memory, or various combinations of these. The memory 138 may store various forms of application software, such as an operating system (OS) 140, a grid monitoring module 145, an output monitoring module 150, and a compensation control module 155.

The operating system 140 facilitates interaction of the modules in memory 138 with the CPU 136 and support circuits 137. The grid monitoring module 145 is executed to determine the instantaneous voltage and/or power on the AC bus lines L1, L2, and L3 and/or the DC input power. The grid monitoring module 145 samples the AC bus lines L1, L2, and L3 to obtain sample data as feedback to the compensation control module 155. In some embodiments, the grid monitoring module 145 also measures DC power to predict the converter AC output power to the AC bus lines L1, L2, and L3.

The output monitoring module 150 processes voltage and current data from the converters 120, 125, and 130. The compensation control module 155 compares sampled data from each of the converters 120, 125, and 130 and subsequently adjusts power generated (i.e., AC voltage and current) by one or more of the converters 120, 125, and 130 to ensure all voltage and power output levels are substantially equal or within predetermined operating tolerance requirements. The compensation control module 155 may determine whether voltage and power levels for each phase are substantially balanced based on one or more predetermined thresholds. The connectivity of respective converters to the AC bus lines L1, L2, and L3 must also be predetermined for larger systems comprising multiple converters outputting any given phase.

In some embodiments, the compensation control module 155 receives grid monitoring samples from the grid monitoring module 145 to ensure the converters (120, 125, 130) are outputting balanced power to the AC grid 160. The grid monitoring module 145 may communicate with the compensation control module 155 to determine whether the compensated converters are outputting an expected corrected power. The grid monitoring module 145 may also trigger a system shutdown when the multi-phase power on lines L1, L2, and L3 is unbalanced despite compensation by the compensation control module 155.

The grid monitoring module 145 is also used for loss of phase detection. A loss of phase on "a grid side" is measured with the AC line interface 165 and would trigger the converters 120, 125, and 130 to operate in a voltage support state using control bus lines 122, 128, and 132. Voltage support states include Low Voltage Ride-Through (LVRT) and High Voltage Ride-Through (HVRT) as determined by the controller 131.

In some embodiments, the grid monitoring module 145 also monitors for a loss of phase via the AC line interface 165 and may trigger a system shutdown for a loss of phase condition.

In other embodiments where multiple converters are coupled to each phase of the AC grid 160, the compensation control module 155 compares the AC voltage and/or power levels generated for each phase to determine whether an imbalance exists. If an imbalance exists, the compensation control module 155 may compare voltage and/or power generated by one or more individual converters for determining the appropriate compensation.

In some embodiments, memory 138 includes a database module 142. The database module 142 stores data related to embodiments of the present invention, such as thresholds for use in determining the voltage and/or power compensation. The database module 142 may also store data indicating as to which phase each of the inverters is coupled to, and ultimately outputting to respective AC bus lines L1, L2, and L3.

Lines L1, L2, and L3 are each respectively carrying a different phase AC power. During operation of the converters (120, 125, 130), there may be differences in the voltage and/or power levels generated by the converters 120, 125, and 130 such that one converter's voltage and/or power output is of a lower level than the other converter outputs. This may be due to shading conditions, partial failure of the PV module or otherwise defects in the power conversion circuitry within a converter, or the like.

For example, the first phase outputted by converter 120 onto AC bus line L1 may be of a power that is 3% lower than each of the second phase outputted by converter 125 onto line L2 and the third phase outputted by converter 130 onto AC bus line L3. In order to compensate for such a phase imbalance, the power output by each of the converters (125 and 130) coupled to the AC bus lines L2 and L3 is subsequently lowered by 3% to match the power level of the first phase outputted by converter 120 onto AC bus line L1. In this example, two outputs are compensated to the previously lower third output, such that all outputs are of a substantially equal power level.

Further embodiments include increasing or decreasing one or more converter outputs such that the AC voltage and the power from the converters 120, 125, and 130 are each substantially balanced. During instances when at least one phase is completely absent (i.e., loss of phase), the controller 131 disconnects all converters (120, 125, and 130) from the bus lines (L1, L2, and L3) and the system 100 ceases providing power to the AC grid 160.

Additional embodiments may include additional energy storage (e.g., capacitors, rechargeable batteries, and the like) capable of storing excess energy and discharging the excess energy to compensate converter output. Energy storage provides system "headroom" and increases the overall compensation capacity of the system 100. In such an embodiment, the controller 131 selectively charges or discharges the energy storage to correct the converter output based on voltage and current samples.

In some embodiments, sensor circuitry may be a separate unit connected to the controller 131 through the control bus lines 122, 128, and 132 at line interface 165. Even further still, some embodiments may include more than three converters such that the number of converters represents a factor of the total phases (i.e., in the example above, a multiple of 3). Thus, the number of converters is a multiple of the number of phases such that in a system comprising N phases, P·N is the total number of converters for the overall system (where P is any integer).

In some embodiments the number of power converters per phase is different. The number of converters is a multiple in addition to an integer (e.g., PN+1, PN+2, and the like). In such embodiments, the controller 131 may selectively operate the phase with more converters based on the magnitude of the phase with fewer converters. For example, in a system wherein the first and second phases have seven converters while the third phase has six, the controller 131 may selectively operate the six of the seven converters in each of the first and second phases. Alternatively, all seven converters of the first and second converters may be operated to output a lower power that aggregates to the magnitude of the power of the third phase.

Further embodiments may include a neutral line in addition to the three-phase bus lines. In such an embodiment, each converter may be connected to a respective phase line (e.g., a first converter to a first phase bus line) as well as to the neutral line. Similarly, in such embodiments, the neutral line may be used to detect a loss of phase, voltage imbalance, and/or power imbalance.

Figure 2:
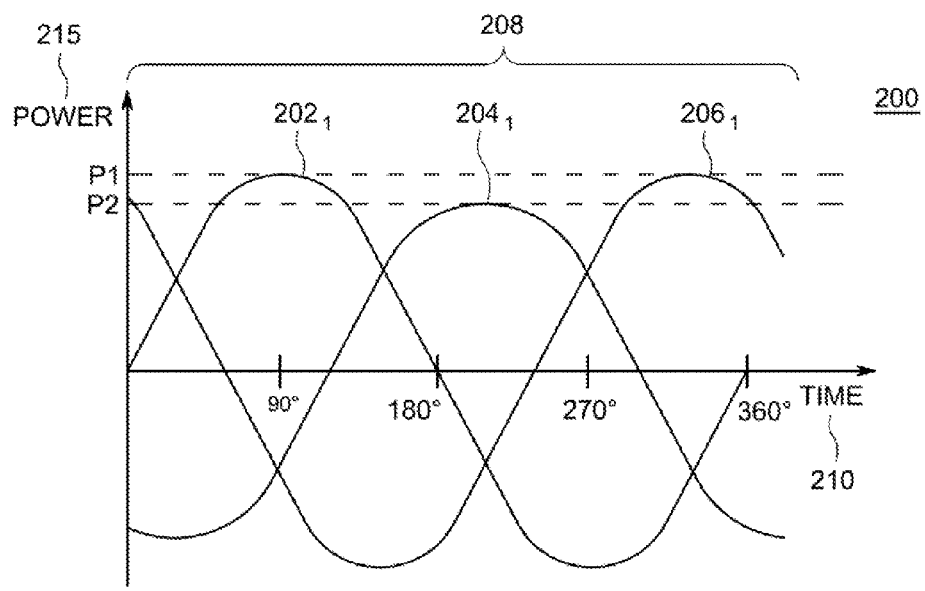
FIG. 2 is an exemplary graph of output power from converters in the distributed power system as described in FIG. 1 in accordance with one or more embodiments of the present invention.

FIG. 2 is an exemplary graph 200 of output power 208 from converters 120, 125, and 130 in the distributed power system as described in FIG. 1 in accordance with one or more embodiments of the present invention. The output power 208 exemplarily comprises one phase lower than the other two phases to demonstrate power imbalance. The graph 200 comprises a plot of output power 208 over time 210. In this example, the output power 208 has one converter outputting less power however, in alternative embodiments there may be two converters outputting a suddenly lower power. In such an embodiment, the third converter outputting a relatively greater power may be corrected to match the lower power level of the output of the other converters. Additionally or alternatively, the two lower-power converters may be adjusted by the controller 131 to increase output power.

The output power 208 comprises three exemplary measured waveforms ($202_1$, $204_1$, $206_1$). Alternatively, the waveforms ($202_1$, $204_1$, $206_1$) may be calculated using measured DC power input to respective converters. The waveform $202_1$ is the single-phase AC output from a first converter coupled to a first AC grid phase (e.g., converter 120), the waveform $204_1$ is the single-phase AC output from a second converter coupled to a second AC grid phase (e.g., converter 125), and the waveform $206_1$ is the single-phase AC output from a third converter coupled to a third AC grid phase (e.g., converter 130). As shown on the graph 200, the power output of the second converter is at a power level Pl that is less than the power level Pl of the other converters. In the embodiment depicted in FIG. 2, the difference between Pl and Pl exceeds a threshold value (e.g., ±3%) to trigger power compensation, while remaining less than a threshold (e.g., 5%) to trigger a system shutdown for phase imbalance. The threshold is predetermined and based on regulatory requirements (e.g., 3-10%) or may be based on the load. For example, motors and rotating machinery may have lower tolerances for phase imbalance. Alternatively, the imbalance can be interpreted by an equation.

The controller 131 determines the power level generated by the converters for each phase, as previously described. In some embodiments, the controller 131 may determine the power on each phase at a rate based on the cycle (e.g., half or full cycle) for the controller 131 to quickly correct and compensate for the power imbalance before the imbalance triggers an alarm or shutdown of the power system 100. Upon determining that the power generated for the second AC grid phase is sufficiently lower than the power generated for each of the first and the third AC grid phases, the controller 131 may compensate for the power imbalance by controlling the first and third converters (e.g., by issuing control commands to the converters) to reduce their power output to that of the second converter (e.g., power level Pl ). In alternative embodiments, the controller 131 may control converter 125 (e.g., by issuing control commands to the converter 125) to increase power output, to reach power level Pl . After providing compensation for the imbalance, the controller 131 monitors the output power of the converters to determine if the ordered compensation configuration is successful and may further adjust power generated as needed. The controller 131 may aggregate the output power of all converters for a phase, or receive a power measurement at the line interface 165.

Figure 3:
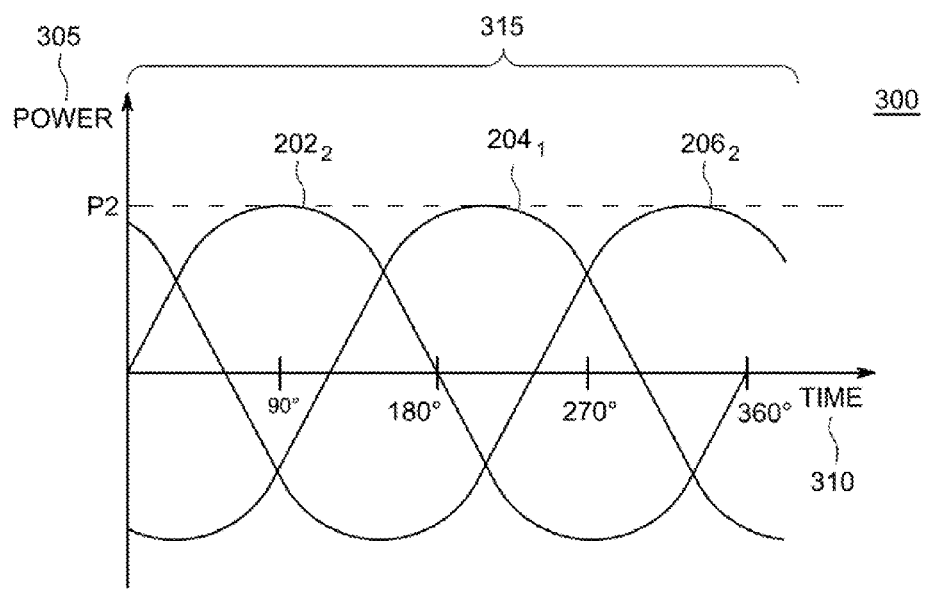
FIG. 3 is an exemplary graph of output power from converters in the distributed power system as described in FIG. 1 after power imbalance correction in accordance with one or more embodiments of the present invention.

FIG. 3 is an exemplary graph 300 of output power 315 from converters 120, 125, and 130 in the distributed power system as described in FIG. 1 after power imbalance correction in accordance with one or more embodiments of the present invention. The output power 315 may also be a plot of voltage. The output power 315 is plotted over time 310. The output power 315 is corrected (i.e., with respect to the unbalanced output power 208 of FIG. 2) and comprises waveforms ($202_2$, $204_1$, $206_2$) such that the output power 315 of all waveforms are substantially at the Pl power level. Waveform $204_1$ remains uncorrected as the lowest of the power phases. Waveforms $202_2$ and $206_2$ represent corrected converter output of as previously represented by waveforms $202_1$ and $206_1$. Selectively controlling power generated by the converters (120, 125, 130) thus allows correction of the power imbalance and power to be output to the AC grid 160, despite varying PV module and converter output. In some alternative embodiments, a voltage imbalance among the phases may be analogously determined and compensated.

Figure 4:
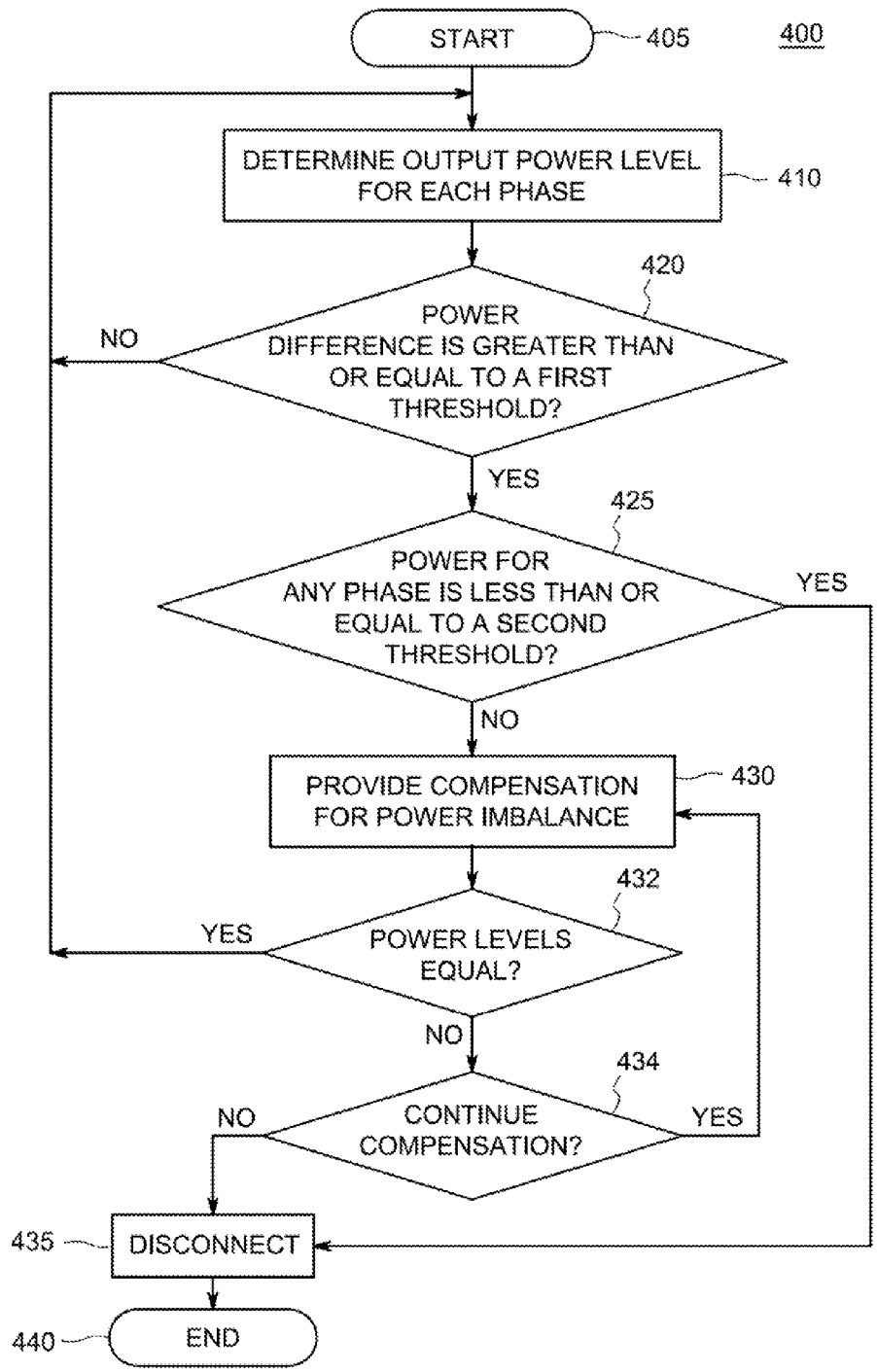
FIG. 4 is a flow diagram of an exemplary method to compensate for power and/or voltage imbalance in accordance to one or more embodiments of the present invention.

FIG. 4 is a flow diagram of a method 400 to compensate for power and/or voltage imbalance in accordance with one or more embodiments of the present invention. Alternative embodiments may include the rearrangement of the steps in method 400 depicted in FIG. 4. The method 400 may be implemented to provide power and/or voltage imbalance compensation for a distributed power system comprising a plurality of power converters coupled to a multi-phase AC line. In some embodiments, such as the embodiment described below, a plurality of single-phase power converters are coupled to a three-phase AC grid and the method 400 is implemented to compensate for any power imbalances. One example of such an embodiment is shown in FIG. 1. The method 400 is implemented by the controller 131. The method 400 and begins at step 405 and proceeds to step 410.

At step 410, output power generated for each phase (i.e., from the converters 120, 125, and 130 in the embodiment of FIG. 1) is determined. In some embodiments, each converter may determine its power output and communicate such information to the controller 131. Output power may also be calculated using measured DC input power to each converter. In other embodiments, the converters may communicate output current and voltage information to the controller 131 for the controller 131 to determine the output power. In still other embodiments, the controller 131 may measure the output power from each converter, or a separate device may measure the output power from each converter and communicate the information to the controller 131. For example, the power levels of the single-phase AC output power from the converters may be measured by the controller 131.

At step 420 the method 400 determines if a difference in the power generated among the phases exceeds a first threshold (i.e., whether an imbalance exists). For example, a power imbalance may be determined to exist when the power level on one phase differs from the power level on one or both of the remaining phases by at least 3%. The first threshold is a value that would typically trip a power imbalance alarm (e.g., 3% difference between the power levels). In some embodiments the first threshold may be pre-determined, while in other embodiments the first threshold may be dynamically determined. If there are no power differences among the phases that exceed the first threshold, the method 400 returns to step 410.

However, if the output power difference is determined to be greater than or equal to the first threshold at step 420, the method 400 next determines at step 425 if any of the phases have power that is less than or equal to a second threshold (i.e., substantially no power). If the method 400 determines there is no power on a particular phase (i.e., a loss of phase), the method 400 disconnects all converters at step 435 and the method 400 ends at step 440. However, if it is determined at step 425 that no phases have substantially zero power, the method 400 provides compensation for the power imbalance by adjusting the power output from one or more converters at step 430.

At step 430, the method 400 determines the output power level of the converter(s) and subsequently adjusts the output power of one or more converters to compensate for the power imbalance. Switches within the converters are operated by the controller 131 to selectively increase or decrease output power of the converters. In order to increase or decrease output power of the converters, the switches may control the charging or discharging of energy from energy storage devices coupled to or within the converters. Discharging energy allows for a temporary increase of output power by the converter, while charging may temporarily decrease the output power. Alternative embodiments may manage output power using pulse width modulation or changing the switching frequencies.

In order to determine the appropriate compensation, the output power generated by each converter in the system may be evaluated by taking into consideration the phase to which each converter is coupled. For example, if converter 120 is outputting at a higher power level than that of converters 125 and 130 (e.g., 3% greater and 5% greater respectively), the power generation by converter 120 may be adjusted to output a power level to match that of converter 130. Similarly, the converter 125 may also be adjusted to output AC power at a power level substantially equal to converter 130. Further embodiments may alert a user (or an operator) of the adjustment and/or allow the user to manually adjust the output powers of the converters through communication gateway of the controller 131 (e.g., wireless, power line communication, etc.).

The method 400 proceeds from step 430 to step 432. At step 432, the method 400 detects whether the power levels on all phases are substantially equal. If it is determined that, the powers are still not sufficiently equal, the method 400 continues to step 434 to determine whether adjustment of the converters should continue. Step 434 may revert back to step 432 a pre-determined number of times in an effort to adjust powers across all phases. If however, the method 400 determines compensation is not to continue, the method 400 continues to step 435 to disconnect all converters as the power imbalance is not able to be corrected. Alternatively, step 435 may send all converters into a voltage support state. If however, the power levels are equal at step 432, the method 400 continues back to step 410. In one or more other embodiments, the method 400 may analogously determine whether other adaptive power control is necessary to correct a voltage imbalance, as well as phase imbalance, frequency, power factor, and harmonics among the phases by controlling converters using measured AC parameters at the output of converters. Further embodiments include adjusting multi-phase converters across multi-phase systems.

In addition to method 400, converters that are turned off (i.e., "disconnected") may subsequently turned back on gradually turn back on, for example by ramping up power on for each converter. Alternatively, all converters may be turned on at substantially the same time.

The aforementioned embodiments are directed towards power imbalance compensation however, alternative embodiments may employ similar structures in voltage or phase imbalance compensation. In such an embodiment, an output voltage difference or phase imbalance would be detected (e.g., via voltage sensors) among the converter outputs and the remaining converters would be adjusted such that all bus lines carry about the same voltage.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. An apparatus for power imbalance correction comprising:
    a plurality of converters for converting a plurality of DC inputs to a multi-phase AC output and coupling the multi-phase AC output to a multi-phase AC line, wherein the plurality of converters comprises a first converter and at least a second converter separate from the first converter, and wherein the first converter couples output power to a first subset of lines of the mufti-phase AC line and the at least a second converter couples output power to a second subset of lines of the multi-phase AC line, the second subset different from the first subset; and
    a controller coupled to the plurality of converters for:
        (i) determining whether phases of the multi-phase AC output are balanced, and
        (ii) controlling, when all phases of the multi-phase AC output are not balanced, at least one converter of the plurality of converters to balance the multi-phase AC output.

2. The apparatus of claim 1, wherein to balance the multi-phase AC output further comprises compensating for a power difference among the phases output by the at least one converter.

3. The apparatus of claim 2, wherein controlling the at least one converter further comprises controlling switches in the at least one converter.

4. The apparatus of claim 1, wherein to balance the multi-phase AC output further comprises compensating for a voltage difference among the phases output by the at least one converter.

5. The apparatus of claim 1, wherein phases of the multi-phase AC output are determined as balanced by detecting a difference between the phases output by the plurality of converters on the multi-phase AC line does not exceed a first threshold.

6. The apparatus of claim 5, wherein the controller triggers a shutdown of the apparatus when the difference between the phases exceeds the first threshold and at least one of the phases is of a power level less than a second threshold.

7. The apparatus of claim 1, wherein the plurality of converters is a multiple of a number of phases in the multi-phase AC line.

8. The apparatus of claim 1, wherein to balance the multi-phase AC output, the controller decreases a combined power output to the multi-phase AC line to match a power level of a phase with a lowest power level.

9. The apparatus of claim 8, wherein matching the power level of the phase with the lowest power level further comprises the plurality of converters outputting AC power at a substantially equal power level.

10. The apparatus of claim 1, wherein to balance the multi-phase AC output, the controller increases a combined power output to the multi-phase AC line to match a power level of a phase with a higher power level to correct the multi-phase AC output of all phases to be at a substantially equal power level.

11. A method for power imbalance correction in a multiphase system comprising:
  converting power from a plurality of DC inputs in a plurality of converters to a multi-phase AC output, and coupling the multi-phase AC output to a multi-phase AC line, wherein the plurality of converters comprises a first converter and at least a second converter separate from the first converter, and wherein the first converter couples output power to a first subset of lines of the multi-phase AC line and the at least a second converter couples output power to a second subset of lines of the multi-phase AC line, the second subset different from the first subset;
  determining whether phases of the multi-phase AC output are balanced; and
  controlling, when all phases of the multi-phase AC output are not balanced, at least one converter of the plurality of converters to balance the multi-phase AC output.

12. The method of claim 11, wherein to balance the multi-phase AC output further comprises compensating for a power difference among the phases output by the at least one converter.

13. The method of claim 12, wherein controlling the at least one converter further comprises controlling switches in the at least one converter.

14. The method of claim 11, wherein to balance the multi-phase AC output further comprises compensating for a voltage difference among the phases output by the at least one converter.

15. The method of claim 11, wherein phases of the multi-phase AC output are determined as balanced by detecting a difference between the phases output by the plurality of converters on the multi-phase AC line does not exceed a first threshold.

16. The method of claim 15, wherein the controller triggers a shutdown of the system when the difference between the phases exceeds the first threshold and at least one of the phases is of a power level less than a second threshold.

17. The method of claim 11, wherein the plurality of converters is a multiple of a number of phases in the multi-phase AC line.

18. The method of claim 11, wherein to balance the multi-phase AC output comprises decreasing a combined power output to the multi-phase AC line to match a power level of a phase with a lowest power level.

19. The method of claim 18, wherein matching the power level of the phase with the lowest power level further comprises the plurality of converters are outputting AC power at a substantially equal power level.

20. The method of claim 19, wherein to balance the multi-phase AC output comprises increasing a combined power output to the multi-phase AC line to match the power level of a phase with a higher power level to correct the multi-phase AC output of all phases to be at a substantially equal power level.

* * * * *